United States Patent [19]

Atherton et al.

[11] Patent Number: 4,564,173
[45] Date of Patent: Jan. 14, 1986

[54] TREE PUSH

[76] Inventors: Peter W. Atherton; George Spector, both of 233 Broadway, Rm. 3615, New York City, N.Y. 10007

[21] Appl. No.: 591,195

[22] Filed: Mar. 19, 1984

[51] Int. Cl.$^4$ ............................................. B66F 3/24
[52] U.S. Cl. .............................................. 254/133 R
[58] Field of Search ............... 254/133, 134, DIG. 1, 254/35; 269/76; 144/34 A

[56] References Cited

U.S. PATENT DOCUMENTS

| | | | |
|---|---|---|---|
| 1,465,895 | 8/1923 | Daniels | 254/133 R |
| 1,477,298 | 12/1923 | Templeton | 254/133 R |
| 1,482,846 | 2/1924 | Harroh | 254/133 R |
| 2,031,507 | 2/1936 | Gloekler | 269/76 |
| 3,834,669 | 9/1974 | Reid | 254/133 R |
| 4,148,462 | 4/1979 | Jessup | 254/133 R |
| 4,304,394 | 12/1981 | O'Hara et al. | 254/133 R |

Primary Examiner—Robert C. Watson

[57] ABSTRACT

In combination with a bumper jack an apparatus for pushing a tree over when the tree is being cut down is provided so that when a base connected to the bumper jack is placed on a ground surface the apparatus is tipped at an angle between the ground surface and the tree a jack handle will operate a jack mechanism to rise along a jack post causing a support member to push a shaft through an aperture in a guide member until points on a tip member will contact the tree, pushing the tree over when the tree is being cut down.

1 Claim, 11 Drawing Figures

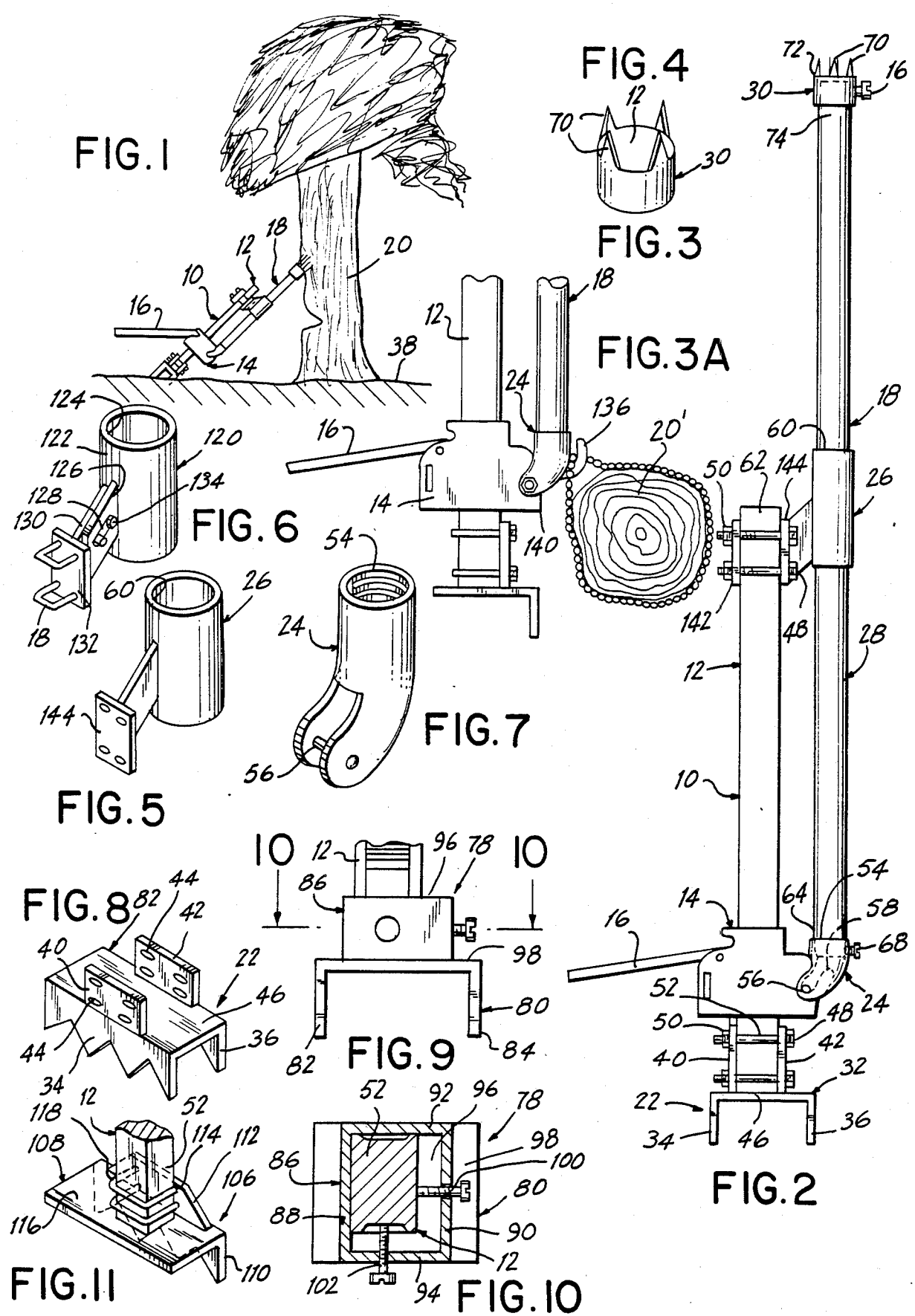

TREE PUSH

BACKGROUND OF THE INVENTION

The instant invention relates generally to bumper jacks and more specifically it relates to a bumper jack having an apparatus for pushing a tree over when the tree is being cut down.

When cutting trees with power saws at least two men must be used. One man uses the power saw while the other man pulls the tree to one side by a rope to prevent the power saw from getting jammed when cutting the tree. This situation is not desirable so accordingly it is in need of an improvement.

SUMMARY OF THE INVENTION

A principle object of the present invention is to provide a bumper jack having an apparatus for pushing a tree over when the tree is being cut down that can be used by one person allowing him to use the power saw.

Another object is to provide a bumper jack having an apparatus for pushing a tree over when the tree is being cut down that is safe whereby it will not slip when engaging the tree and the ground surface.

An additional object is to provide a bumper jack having an apparatus for pushing a tree over when the tree is being cut down that can also lift the tree high enough to free a power saw that became jammed when cutting the tree into sections after the tree was felled.

A further object is to provide a bumper jack having an apparatus for pushing a tree over when the tree is being cut that is simple and easy to use.

A still further object is to provide a bumper jack having an apparatus for pushing a tree over when the tree is being cut down that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side elevational view of the invention in use against a tree.

FIG. 2 is an enlarged side elevational view of the invention.

FIG. 3 is a partial enlarged side elevational view similar to FIG. 2 showing a modification.

FIG. 4 is a perspective view of the tip member.

FIG. 5 is a perspective view of the guide member.

FIG. 6 is a perspective view similar to FIG. 5 showing a modification.

FIG. 7 is a perspective view of the support member.

FIG. 8 is a perspective view of the base member.

FIG. 9 is a front elevational view of a modified base member.

FIG. 10 is a cross sectional view taken along line 10—10 in FIG. 9.

FIG. 11 is a perspective view similar to FIG. 8 showing another modification of the base member.

DETAILED DESCRIPTION OF THE PREFERRED EMBODIMENTS

Turning now descriptively to the drawings, in which similar reference characters denote similar elements throughout the several views, FIGS. 1 and 2 illustrates a bumper jack 10 having a jack post 12, a jack mechanism 14 and a jack handle 16.

An apparatus 18 for pushing a tree 20 over when the tree 20 is being cut down consists of a base member 22, a support member 24, a guide member 26, an elongated shaft 28 and a tip member 30.

As best seen in FIGS. 2 and 8 the base member 22 consists of an inverted U-shaped channel 32 having notched out side walls 34 and 36 to prevent the base member 22 from sliding on a ground surface 38. A pair of spaced apart vertical plates 40 and 42 are provided whereby each plate 40 and 42 have at least two horizontal spaced apart elongated apertures 44. The plates 40 and 42 are mounted such as by welding to top 46 of the channel 32. Bolts 48 fit through the elongated aperture 44 while nuts 50 are tightened on ends of the bolts 48 to hold the bottom 52 of the jack post 12 in position between the plates 40 and 42.

In FIGS. 2 and 7 the support member 24 has an aperture 54 and is mounted to the jack mechanism 14 by a pin 56. The pin 56 slips onto a hook 58 on the jack mechanism 14.

In FIGS. 2 and 5 the guide member 26 has an aperture 60 and is mounted to top 62 of the jack post 12. The elongated shaft 28 is slidably placed through the aperture 60 in the guide member 26 with bottom end 64 of the shaft 28 affixed into the aperture 54 in the support member 24 by a set screw 68 whereby the shaft 28 is parallel with the jack post 12.

In FIGS. 2 and 4 the tip member 20 has four points 70 on top 72. The tip member 20 is affixed onto top end 74 of the shaft 28 by a set screw 76. When the apparatus 18 is tipped at an angle preferably at 45°, between the ground surface 38 and the tree 20 the jack handle 16 will operate the jack mechanism 14 to rise along the jack post 12 causing the support member 24 to push the shaft 28 through the aperture 60 in the guide member 26 until the points 70 on the tip member 30 will contact the tree 20, pushing the tree 20 over when the tree is being cut down by a power saw (not shown).

FIGS. 9 and 10 show another type of base member 78 that contains an inverted U-shaped channel 80 having notched out side walls 82 and 84. A container 86 having two side walls 88 and 90, two end walls 92 and 94 and an open top 96 is mounted to top 98 of the channel 80. One of the side walls 90 have a threaded aperture 100 and one of the end walls 94 have a threaded aperture 102. Bolts 104 are each threaded into the threaded apertures 100 and 102 in the container 86 to bear against sides of the bottom 52 of the jack post 12 placed within the container 86. Different size jack posts (not shown) can be inserted within the container 86.

FIG. 11 shows still another type of base member 106. An inverted L-shaped channel 108 has a notched out side wall 110. A vertical plate 112 is provided and has two pair of horizontally spaced apart holes 114. The plate 112 is mounted, such as by welding, to top 116 of the channel 108. Two U-bolts 118 fit around the bottom 52 of the jack post 12 and into the two holes 114 in the vertical plate 112. Four nuts (not shown) are tightened on each end of the U-bolts 118 to hold the bottom 52 of the jack post 12 in position between the U-bolt 118 and the plate 112.

An improved guide member 120 is illustrated in FIG. 6 and consists of a cylinder 122 having an aperture 124 therethrough. A first diagonal vertical plate 126 has an elongated slot 128 therethrough and is affixed perpendicular such as by welding, to side of the cylinder 122. A second diagonal vertical plate 130 has an elongated slot (not shown) therethrough like in plate 126.

A plate 132 is affixed, such as by welding, perpendicular to end of the second plate 130. Two bolts 134 slideably fits into the elongated slots in the first and second plates 126 and 130. Two nuts (not shown) are tightened on the bolts 134 so that the first and second plates 126 and 130 can be adjusted to maintain a uniform distance between the jack post 12 and the shaft 28. U-bolts 188 and nuts (not shown) can be used, as in the base member 106, to hold the guide member 120 to the top 62 of the jack post 12.

In FIG. 3 a grab hook 136 is attached to side of the support member 24 so that a continuous piece of chain 138 can be hooked on the grab hook 136 and around trunk of a felled tree 20'. The apparatus 18 can lift the tree 20' high enough to free a power saw (not shown) that became jammed when cutting the tree 20' into sections. Instead of the pin 56 and hook 58 the support member 24 can be directly connected to the jack mechanism 14 by a bolt 140.

The guide member 26 can be connected to the top 62 of the jack shaft by using a mounting plate 142 and 144 and bolts 48 and nuts 50 as in the base member 22.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In combination with a bumper jack having a jack post, a jack mechanism and a jack handle, an apparatus for pushing a tree over when the tree is being cut down comprises:
    (a) a base member having a notched out bottom to prevent the base member from sliding on the ground surface, the base member mounted to the bottom of the jack post;
    (b) a support member having an aperture mounted to the jack mechanism;
    (c) a guide member having an aperture mounted to the top side of the jack post;
    (d) an elongated shaft slidably placed through the aperture in the guide member with the bottom end of the shaft affixed into the aperture in the support member whereby the shaft is parallel with the jack post; and
    (e) a tip member having a plurality of points on top, the tip member affixed onto the top end of the shaft so that when the apparatus is tipped at an angle between the round surface and the tree the jack handle will operate the jack mechanism to rise along the jack post causing the support member to push the shaft through the aperture in the guide member until the points on the tip member will contact the tree, pushing the tree over when the tree is being cut down, wherein the guide member in the apparatus further comprises:
    (f) a cylinder having an aperture therethrough;
    (g) a first diagonal vertical plate having an elongated slot therethrough affixed perpendicular to the side of the cylinder;
    (h) a second diagonal vertical plate having an elongated slot therethrough;
    (i) a plate affixed perpendicular to end of the second plate;
    (j) at least one bolt that slideably fits into the elongated slots in the first and second plates; and
    (k) at least one nut that is tightened on the bolt so that the first and second plates can be adjusted to maintain a uniform distance between the jack post and the shaft.

* * * * *